UNITED STATES PATENT OFFICE.

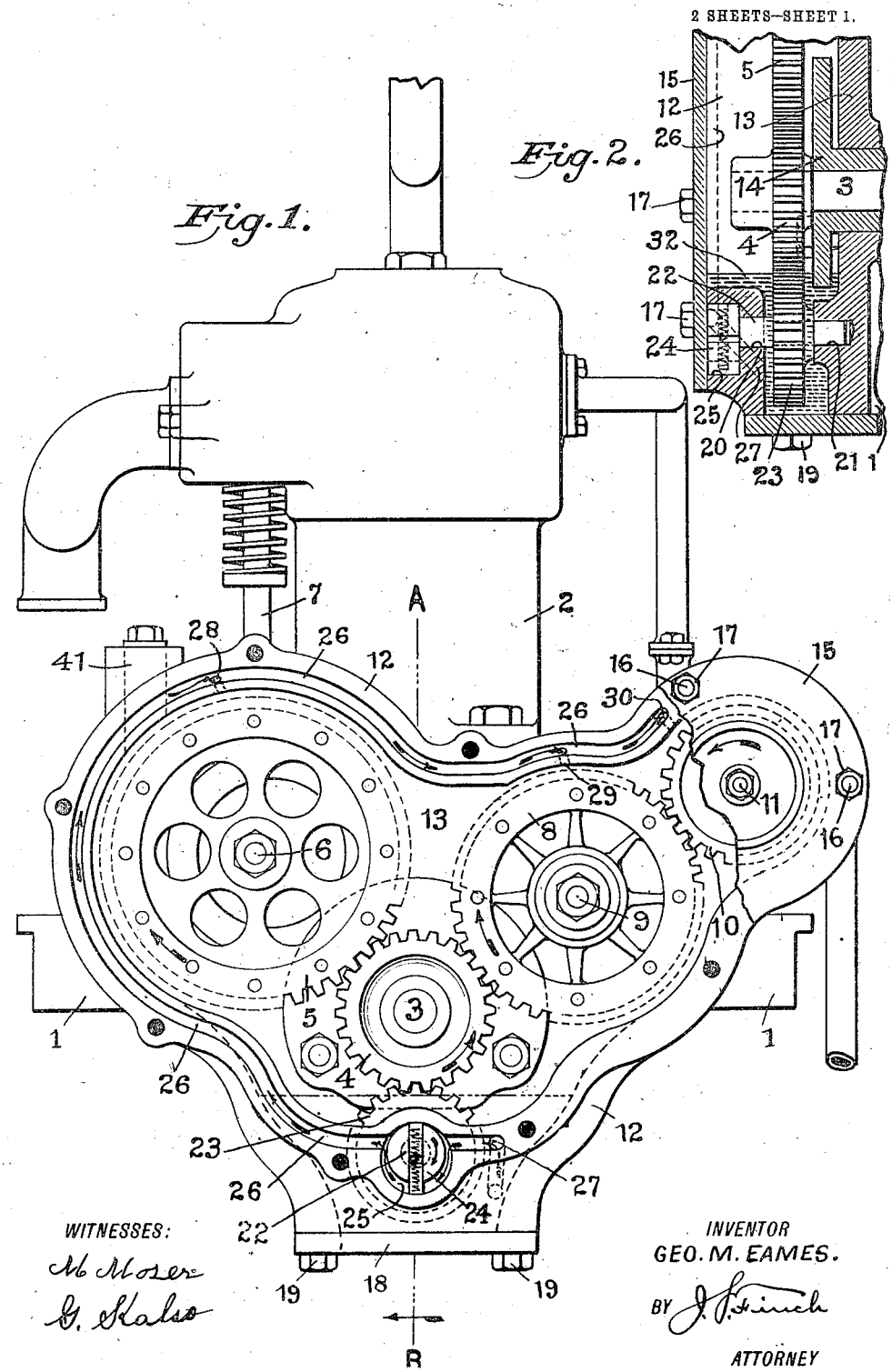

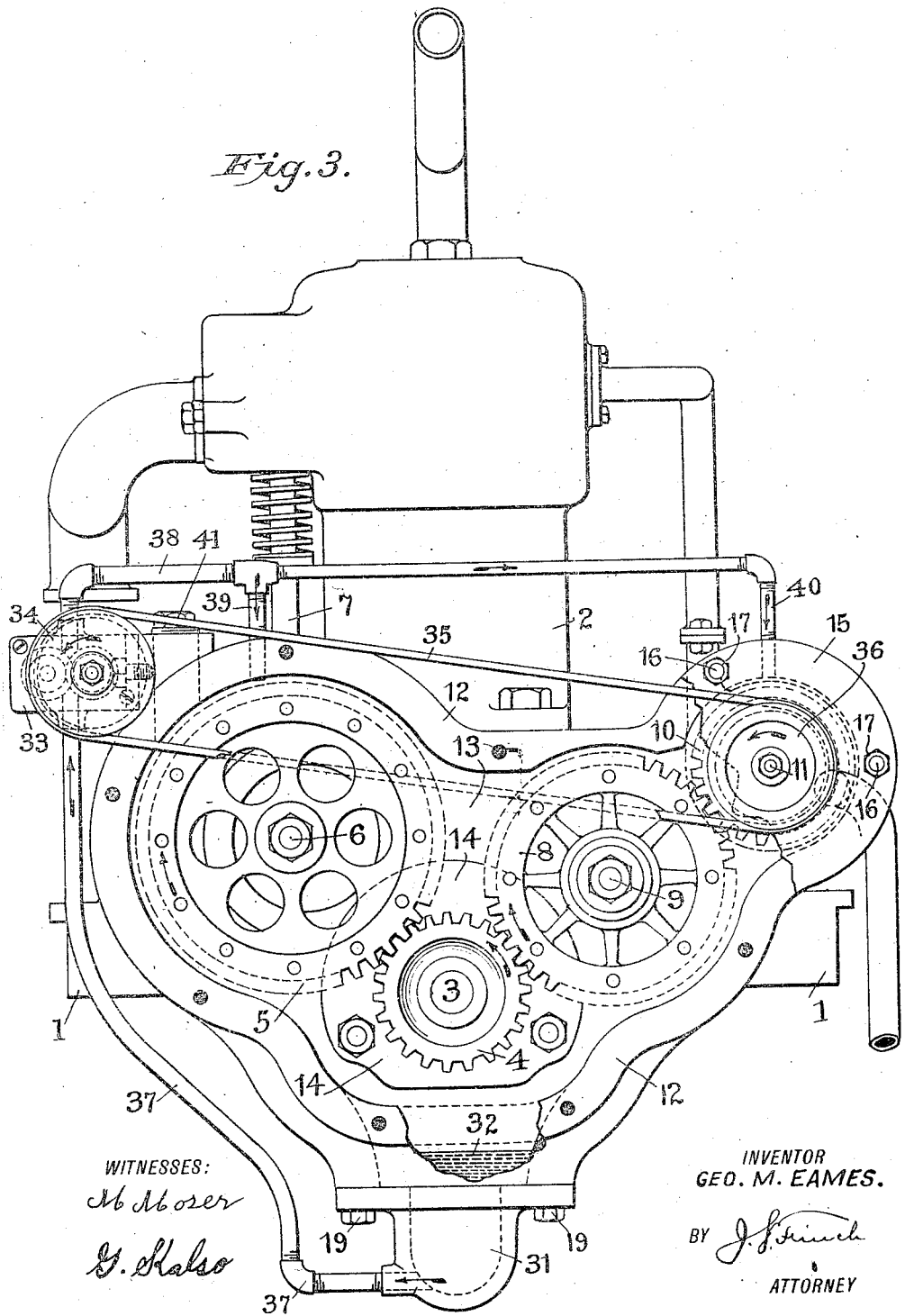

GEORGE M. EAMES, OF BRIDGEPORT, CONNECTICUT.

EXPLOSIVE-ENGINE FOR MOTOR-VEHICLES.

981,251.   Specification of Letters Patent.   Patented Jan. 10, 1911.

Application filed October 4, 1909. Serial No. 520,790.

*To all whom it may concern:*

Be it known that I, GEORGE M. EAMES, a citizen of the United States, residing in Bridgeport, in the county of Fairfield and State of Connecticut, have invented a new and useful Improvement in Explosive-Engines for Motor-Vehicles, of which the following is a specification.

My invention relates to certain new and useful improvements in explosive engines for motor vehicles and has especial reference to the proper lubrication of the gearing therein employed commonly known as the "timing gears"—such gears are usually inclosed within a chamber or case separate from the crank-chamber to protect them from dust, dirt and the weather; and it has been customary to fill, or partially fill, this gear-case with a heavy oil or other lubricant, in order that the gear teeth may be well lubricated and the noise and shock of their impact eliminated or greatly reduced.

Before proceeding further to a more detailed description of my invention, I desire to state that the oil for lubricating the cylinders, crank action, etc., is of a far different composition than the lubricant it is desirable to use on the timing gears; and that it is desirable to prevent the latter lubricant from finding access into the crank-action chamber and thence to the cylinders. The reason for this will be readily appreciated when it is known that only de-carbonized oil may be used in the cylinders, while any heavy lubricant may be used on the gears; and should oil containing carbon find its way to the cylinders, the action of the intense heat causes the carbon to become solidified and cake on the interior walls of the cylinders, thereby not only greatly fouling them, but in the course of time when such carbon deposit has accumulated sufficiently, it will become so heated as to cause the combustible charge to be exploded at the wrong time, thus greatly interfering with the proper working of the engine.

While filling of the gear-case with lubricant has been greatly beneficial in reducing the noise and shock of the gears, such procedure has, however, been injurious to the action of the engine, since the "hydraulic head" or pressure produced by filling the gear-case causes this lubricant to be forced back into the crank casing through the shaft journal, which very soon becomes sufficiently loose to allow such passage of oil.

By the aid of my improvements the gears are kept thoroughly lubricated, insuring easy and quiet running, while the objectionable feature of the gear-lubricant being forced back into the cylinder compartment is entirely overcome.

My invention comprises means for supplying these gears with a continuously circulating stream of lubricant free to flow over the gear teeth but having no pressure or "head" to force its way through the crank-shaft journal into the crank-chamber; and consists, broadly, in providing a reservoir of lubricant located below the crank-shaft bearing, with operative connections for conveying the lubricant from the reservoir to a point above or near the gears and discharging the same thereon, the lubricant being then free to flow back by gravity into said reservoir and be used over and over again. The instrumentalities for accomplishing this desirable result I will now describe, reference being had to the accompanying drawings which illustrate one type of explosive engine, commonly known as the Chas. F. Herreshoff "1908" motor, equipped with my improvements.

Figure 1— illustrates an end view of the motor with the cover-plate of the timing-gear case partly broken away, or removed so as to expose the gears. Fig. 2— a vertical sectional elevation taken in the plane indicated by the line A, B, on Fig. 1, partly broken away: and Fig. 3— a view similar to Fig. 1, but illustrating a modified form of applying my invention.

In describing my improvements, only such limited reference will be made to the usual well known parts of the motor as is deemed necessary for a proper understanding of my invention.

Similar numbers of reference denote like parts throughout the several figures.

1— is the engine base or crank-casing upon which is mounted the cylinders 2 (only one shown). 3— is the crank-shaft journaled within the casing in the usual or any suitable manner and carrying a pinion 4, tight thereon, which intermeshes with a gear 5, tight on the cam-shaft 6, from which latter are actuated the valve-stems 7 which control the intake and exhaust of the engine in the usual or any approved manner. 8— is an idler-gear, journaled upon a stud 9, which also intermeshes with the pinion 4 and serves to transmit motion to a gear 10 secured on a shaft 11. All these gears are inclosed within a compartment or case 12 separated from the crank-chamber by a wall or partition 13; a gland 14 surrounding the crank-shaft 3 serving as an additional safeguard against communication between said compartments. The face of the gear-case 12 is tightly closed by a cover 15 secured in place by the usual bolts 16 and nuts 17, as will be readily understood, while the bottom of said gear-case is closed by a plate 18 secured by bolts 19. All of these parts are of the usual or any approved construction and may be found in the well known Herreshoff motor previously referred to.

Journaled below the crank-shaft 3 in suitable bearings 20, 21, preferably formed integral with the casing, is a shaft 22 which carries tight thereon a gear 23 intermeshing with and driven by the pinion 4. Formed on or connected with the front end of the shaft 22 is a pump 24 of any approved design (preferably the well known Brown & Sharpe oil pump) operating in a chamber 25 formed in the face of the casing.

26 is a groove or channel formed in the face of the casing adjacent to the inside face of the cover-plate 15, by which latter, when bolted into place, said channel is closed to form a conduit. The channel or conduit 26 extends as far around the casing as may be desired and communicates with the pump-chamber 25, which latter is connected with the interior of the case 12, near the bottom thereof, by an intake port 27. Formed in the casing 12 are discharge ports 28, 29, 30, which communicate with said channel or conduit and are located in such position with respect to the gears 5, 8, 10, as to discharge thereon when lubricant is forced through said conduit.

In Fig. 3— I have shown a modified form of my invention especially adapted for application to engines already in use, and referring particularly to this figure, it will be noticed that the usual plate 18 which closes the bottom of the gear-case has been removed and in its place substituted a cover or reservoir 31 containing lubricant 32 in suitable quantity.

33— is a pump of any approved construction (as for instance the well known Brown & Sharpe gear-pump) secured to the casing 1, in any suitable manner and equipped with a pulley 34 which latter is connected by a belt 35 to a pulley 36 mounted on the shaft 11, from which latter said pump is actuated. Said pump 33 is connected on the intake side by a pipe line 37 and discharges into a pipe line 38 having branches 39, 40, which discharge into the gear-case 12 upon the uppermost gears 5, 10, respectively.

A suitable quantity of lubricant 32 is introduced within the casing through the inlet 41. The arrows on the drawings illustrate the motions of the gears and also the travel of the lubricant through the conduits or pipe line, from which, it will be observed, that the lubricant is withdrawn from the bottom of the gear-case, conveyed to the top thereof and discharged upon the gears, from which it is free to trickle back to the bottom of the case and be used over again. By this improved means of lubrication it will be obvious that a continuous stream of lubricant will be supplied to the gears and that no "hydraulic head" or pressure is created whereby the lubricant employed will have a tendency to force its way into the crank-chamber through the crank-shaft journal-case, care being taken in introducing the fluid to not overfill the casing so as to keep the normal level of the lubricant below the crank-shaft journal.

While I have shown and described my improvements as applied to a "Herreshoff 1908" motor, I do not wish to be limited or circumscribed in this respect, since my invention may be applied with equal effect to various other designs of explosive engines.

Having thus described my invention, what I claim as new and desire to secure by Letters Patent is;—

1. In combination with an internal combustion engine equipped with gears for actuating the mechanism which controls the intake and exhaust of the engine, said engine being provided with a casing which incloses said gears and separates them from the crank-chamber of the engine, the crank-shaft of the engine extending into said casing and the casing being adapted to retain a quantity of lubricant, of means for maintaining the level of the lubricant below the crank-shaft bearing and positively forcing the lubricant from a point below said crank shaft bearing to a point above the same and discharging it upon the gears, said means being operated from the engine.

2. In combination with an internal combustion engine equipped with gears for actuating the mechanism which controls the intake and exhaust of the engine, said engine being provided with a casing which incloses said gears and separates them from the crank-chamber of the engine, the crank-shaft of the engine extending into said casing and the casing being adapted to retain a quantity of lubricant, means for maintaining the level of the lubricant below the crank shaft bearing consisting of a conduit communicating at one end with the lubricant in said gear casing at a point below the crank-shaft bearing and at no other point and terminating at the other in position to discharge upon said gears, a pump intermediate of the intake and discharge of said conduit and means operated from the engine for actuating said pump for the purpose set forth.

3. In combination with an internal combustion engine equipped with gears for actuating the mechanism which controls the intake and exhaust of the engine, said engine being provided with a casing which incloses said gears and separates them from the crank-chamber of the engine, the crank-shaft of the engine extending into said casing and the casing being adapted to retain a quantity of lubricant, means for maintaining the level of the lubricant below the crank shaft bearing consisting of a conduit communicating at one end with the lubricant in said gear casing at a point below the crank-shaft bearing and at no other point, and terminating at the other in position to discharge upon said gears, said conduit being formed by the inner wall of the cover-plate and a groove or channel extending within the juxtaposed face of the casing, a pump intermediate of the intake and discharge of said conduit and means operated from the engine for actuating said pump, for the purpose set forth.

4. In combination with an internal combustion engine equipped with gears for actuating the mechanism which controls the intake and exhaust of the engine, said engine being provided with a casing which incloses said gears and separates them from the crank-chamber of the engine, the crank-shaft of the engine extending into said casing and the casing being adapted to retain a quantity of lubricant, means for maintaining the level of the lubricant below the crank shaft bearing consisting of a conduit communicating at one end with the lubricant in said gear-casing at a point below the crank-shaft bearing and at no other point and terminating at the other in position to discharge upon said gears, a pump operatively mounted within a chamber formed in the face of said casing and communicating with said conduit intermediate of the points of intake and discharge, means for actuating said pump, comprising a shaft suitably journaled in the casing and operative connections between said shaft and the engine crank-shaft.

5. In combination with an internal combustion engine equipped with gears for actuating the mechanism which controls the intake and exhaust of the engine, said engine being provided with a casing which incloses said gears and separates them from the crank-chamber of the engine, the crank-shaft of the engine extending into said casing and the casing being adapted to retain a quantity of lubricant, means for maintaining the level of the lubricant below the crank shaft bearing consisting of a conduit communicating at one end with the lubricant in said gear-casing at a point below the crank-shaft bearing and at no other point and terminating at the other in position to discharge upon said gears, a pump operatively mounted within a chamber formed in the face of said casing and communicating with said conduit intermediate of the points of intake and discharge, means for actuating said pump, comprising a shaft suitably journaled in the casing and carrying a gear in operative connection with said crank-shaft.

In testimony whereof I have signed my name to this specification in the presence of two subscribing witnesses.

GEORGE M. EAMES.

Witnesses:
STANLEY N. SMITH,
E. L. TOLLES.